UNITED STATES PATENT OFFICE 2,124,606

PROCESS FOR REFINING MINERAL OIL

Johannes Arnoldus Buchel and Reyerus Nicolaas Jan Saal, Amsterdam, Netherlands, assignors to Shell Development Company, San Francisco, Calif., a corporation of Delaware No Drawing. Application November 6, 1933, Serial No. 696,910. In the Netherlands July 23, 1928

5 Claims. (Cl. 196—13)

This invention relates to extraction methods of refining mineral oils, and is particularly concerned with methods for extracting such oils by means of a selective solvent in the presence of benzol or an equivalent auxiliary solvent.

It has been known in the art that crude petroleum oils, lubricating, transformer and spindle oils, kerosenes, heavy or light naphthas, etc., can be separated into groups of components by extraction with suitable selective solvents. A large number of such solvents are available for the purpose. The present invention is particularly (but not exclusively) directed to an improvement in methods of extracting mineral oils with furfural or acetone, which improvement is analogous to the one claimed for $SO_2$ in Patent No. 1,945,516, which issued upon our copending application, Serial No. 379,310, filed July 18, 1929, of which this is a continuation in part.

The invention is based on the discovery that the extraction characteristics of substantially any solvent which is capable of separating a mineral oil into two component groups—one more soluble therein than the other—can be markedly modified by introducing, for example into the extraction mixture, a quantity of benzol or other suitable substance, such as toluol and/or other aromatics, or ether, or chloroform, which will hereafter be referred to as the auxiliary solvent.

The type of selective solvents whose effectiveness as the extracting agents in refining mineral oils can be improved by practicing this invention is illustrated by liquid $SO_2$, furfural, and acetone. These specific examples represent, however, only typical solvents of a large number of known selective solvents capable of separating mineral oils into aromatic and non-aromatic components (sometimes referred to as naphthenic and paraffinic or as non-paraffinic and paraffinic), which solvents are intended to be within the scope of this invention.

Likewise, the auxiliary solvents, whose presence in the extraction mixtures improves the efficacy of extraction, are merely represented by benzol, and aromatic hydrocarbons, in general, or by ether, or by chloroform, or their mixtures, but may be selected from a number of other fluid substances which produce the desired effect, and which can be relatively easily separated from the material being treated, for example by distillation, and have no detrimental effect on the refined products.

It should be noted that, while it may be preferable sometimes to select the auxiliary solvents from relatively volatile liquids chemically or physically related to benzol (such as aromatic hydrocarbons), and which usually are miscible in all proportions with the main solvent and the oil being treated, the invention is not intended to be limited to such solvents. Other substances, such as ether and chloroform, were found to possess the property of improving extraction characteristics of various liquids which may be used as the main solvents, and these relatively volatile liquids are to be considered as equivalents of benzol for the purpose of this specification and the appended claims.

It will be understood, therefore, that the present invention is to include within its scope the extraction processes employing a selective solvent (which may be a single substance or a mixture of suitable substances) and wherein extraction is carried out in the presence of an auxiliary solvent having an action similar to that of benzol, i. e. causing an increase in the efficiency of separating a mineral oil into its components, which may be the naphthenic and paraffinic portions of the oil.

Generally speaking, the efficiency of extraction is determined by the solvent power and the selectivity of the solvent (or solvent mixture) with regard to the components of the mixture being extracted. The efficiency may be measured by and compared with the relative yields of the raffinate of the desired purity in cases where the mass or volume of the main or selective solvent is kept constant.

If the extraction efficiency is to be compared in cases where the relative yield is fixed, whilst also the mass or volume of the main or selective solvent is kept constant, then the quality of the raffinate may be taken as the measure of the efficiency.

The efficiency of the various extractions may also be measured by comparing the extent to which the solvent is conserved, if the same raffinate is made with or without the use of the auxiliary solvents described in this specification.

By applying this invention, i. e. by using a main solvent in the presence of an auxiliary solvent, it becomes possible therefore in extracting hydrocarbon oils to improve the quality and/or quantity of the raffinate and/or to conserve the main solvent.

The method of this invention also provides a means for improving mineral oils having relatively low contents of naphthenic (aromatic) components, which contents it is difficult or impossible to reduce still further by extraction with the main solvent alone.

The improved qualities of the raffinate may be controlled, e. g. by determining the viscosity index, the $n_D$ or refractive index, or the stability against oxidation. All these properties are dependent on the ratio between aromatics (non-paraffins) and the paraffins.

The increased extraction efficiency of the mixed solvent process, as compared with the efficiency of the corresponding single solvent process, is apparently due to the favourable effect of the mixed solvent on the distribution ratios of the non-paraffinic and paraffinic components of the oil in the extract and raffinate phases; in other words, the content of the components preferentially soluble in the selective solvent as compared with that in the raffinate phase is increased in the presence of the auxiliary solvent, so that when a mixed solvent is used it becomes possible sometimes, under suitable temperature conditions, to produce from an oil a greater quantity of the raffinate, which is richer in paraffinic components than it would have been possible to obtain if only the main solvent were used.

From the nature of the auxiliary solvents it may be seen that their addition to the main solvent would normally produce a solvent mixture with a greater solvent power for the oil than that of the main solvent, so that the selectivity of the solvent and the yield of the raffinate may be impaired. Although this is not necessarily a disadvantage, as a main solvent with an auxiliary solvent added thereto in any case will be useful in increasing the extraction efficiency so far as the quality of the raffinate is concerned, it is possible to improve this impaired selectivity by suitably lowering the temperature of extraction with the resultant additional increase in the efficiency of extraction so far as e. g. the yield of the raffinate is concerned. In general, the extraction temperature is so selected as to create optimum conditions from the view points of economy, yield, purity of the products, etc.

The operating details of putting the invention into practice, such as temperatures, pressures, etc. may vary in different cases, depending upon specific properties of the substances used in each case, or may be controlled by some other consideration. For example with a so-called batch-extraction the auxiliary solvent may be mixed with the oil undergoing treatment either before, or at the time the oil is contacted with the main solvent; the whole or a part of the auxiliary solvent may be mixed with the main solvent prior to contacting it with the oil.

It is preferable, although not necessary, to operate the process of this invention in a continuous countercurrent manner, i. e. passing the main solvent countercurrently to and in contact with the oil being extracted through a mixing-settling zone and adding at least a portion of the auxiliary solvent to the oil-main solvent mixture at a point, or points, along the mixing-settling zone, and preferably at such a place where such an addition of the auxiliary solvent would be most effective. The extract and raffinate phases are separated, usually by gravity, and the main and auxiliary solvents or the main solvent only are then removed from each of the phases by distillation (both solvents being removed together or in separate stages) or by some other suitable means. The separated solvents may be continually reused. The auxiliary solvent may be left in the raffinate if this solvent improves the quality of the raffinate, e. g. its anti-knock property in case of the extraction of relatively heavy hydrocarbons with the aid of benzol as auxiliary solvent.

In order to demonstrate the effectiveness of the new process the following example may be set forth.

A number of samples of a lubricating oil having viscosity index −59 (indicating that the oil had a relatively high content of aromatics or a low content of paraffinic hydrocarbons) were thoroughly contacted with various quantities of furfural, and of furfural-benzol, of furfural-chloroform, and of furfural-ether mixtures; in each case the raffinate (upper) layers were separated, and the viscosity and refracting indices of solvent-free portions (raffinates) were determined. The following table contains the pertinent data:

| Oil parts | Furfural parts | Benzol parts | Chloroform parts | Ether parts | Raffinate | |
|---|---|---|---|---|---|---|
| | | | | | $n_D^{20}$ | Viscosity index |
| | Untreated oil | | | | 1.5366 | −59 |
| 100 | 150 | None | | | 1.5160 | +3 |
| 100 | 150 | 50 | | | 1.5136 | +7 |
| 100 | 150 | 100 | | | 1.5115 | +11 |
| 100 | 150 | 150 | | | 1.5100 | +21 |
| 100 | 150 | | 100 | | 1.5082 | +31 |
| 100 | 150 | | | 100 | 1.5125 | +11 |
| 100 | 300 | None | | | 1.5120 | +16 |
| 100 | 300 | 50 | | | 1.5081 | +25 |
| 100 | 300 | 100 | | | 1.5058 | +33 |
| 100 | 300 | 150 | | | 1.5034 | +50 |
| 100 | 300 | | | | 1.5120 | +16 |
| 100 | 300 | | 100 | | 1.5032 | +37 |
| 100 | 300 | | | 100 | 1.5060 | +30 |

These results show that the presence of an auxiliary solvent, such as benzol, or chloroform, or ether, causes a marked improvement in the refined product; the results also demonstrate that non-paraffinic components are extracted in preference to paraffinic components when furfural-benzol mixture is used instead of furfural alone.

The following example further illustrates some of the effects of extraction temperature upon the efficiency of extraction when a motor oil having a viscosity index −5 is extracted.

| Oil parts | Furfural parts | Benzol parts | Chloroform parts | Temperature of extraction °C. | Raffinate | |
|---|---|---|---|---|---|---|
| | | | | | Percent yield | Viscosity index |
| 100 | 100 | | | 80 | 66 | 21 |
| 100 | 100 | 20 | | 72 | 64 | 24 |
| 100 | 100 | 20 | | 65 | 67 | 34 |
| 100 | 100 | 75 | | 29 | 61 | 41 |
| 100 | 100 | 75 | | 15 | 64 | 35 |
| 100 | 100 | | 30 | 39 | 65 | 45 |
| 100 | 100 | | 30 | 29 | 72 | 35 |

These data demonstrate that the yield and the degree of refinement of the raffinate may be controlled at will by regulating the extraction temperature and the relative quantity and the composition of the mixed solvent, and the selective solvent can be conserved, when used with an auxiliary solvent for producing the raffinate having a fixed viscosity index.

Similar results may be obtained when extracting mineral oils with other selective solvents, such as acetone, in the presence of an auxiliary solvent of the type of benzol, chloroform or ether, i. e. either a somewhat polar or more often a non-polar solvent, but whose action is manifested in the extraction processes through an increase in the extraction efficiency.

A series of extractions similar to those demonstrating the use of furfural-auxiliary solvent mixtures were carried out using acetone as the main solvent. The results are tabulated below.

| Oil parts | Acetone parts | Benzol parts | Cyclohexanol parts | Raffinate $d_{20}$ | Raffinate $n_D^{20}$ | Yield, percent | Temp. of extraction °C. |
|---|---|---|---|---|---|---|---|
| 100 | 400 | | | .8719 | 1.4794 | abt 50 | 20 |
| 100 | 300 | 100 | | .8703 | 1.4790 | do 60 | −20 |
| 100 | 240 | 120 | | .8713 | 1.4789 | do 60 | −20 |
| 100 | 300 | | 100 | .8707 | 1.4787 | | −20 |

The original oil extracted with acetone was an Edeleanu raffinate having $d_{20}=.8765$ and $n_D^{20}=1.4820$.

The particular feature of the extractions with acetone and acetone-auxiliary solvent mixtures was that while the first extraction could be carried out at about 20° C., the last three extractions required temperatures of about −20° C. in order to produce either about the same or better yield of the raffinate than obtained with acetone alone. As indicated by gravities and refractive indexes of the raffinates the process of this invention constitutes a decided improvement of the known process using only acetone as a solvent.

It has been also found that various mixtures of selective solvents, such, for example, as liquid $SO_2$-furfural, can be successfully used for extracting mineral oils in the presence of either the individual auxiliary solvents or their mixtures.

While it is practical and may be desirable in some cases to carry out the extraction of mineral oils by means of the main and auxiliary solvents at such temperatures, at which the auxiliary solvent is only partially soluble in either the main solvent or the oil being extracted, or in both, it should be noted that the extraction process of this invention may be operated at the temperatures at which the auxiliary solvent becomes miscible in all proportions with either the main, i. e. selective, solvent or the oil, or both.

The main solvents used in this extraction process to separate a mineral oil into two component groups as defined, have the common characteristic that, like liquid $SO_2$, acetone or furfural, at the extraction temperature they are completely miscible only with the non-paraffinic component group. With the paraffinic component group they are miscible only to a limited extent. Examples of such like selective solvents are: nitromethane, propionitrile, dimethyl sulphate, dimethyl sulphite, methyl formate and several alcohols or esters at suitable temperatures.

With reference to what has been stated above in respect to the auxiliary solvents, it deserves notice that the particular effect of auxiliary solvents on the extraction efficiency is independent of the phenomenon of dilution of the mixture being extracted, which dilution may or may not take place, depending upon viscosities of the liquids involved. Therefore, the process is effective not only with oils which may be viscous at extraction temperatures, but also with oils which are easy flowing or non-viscous at such temperatures. For example, when liquid $SO_2$ is used as selective solvent, the extraction temperatures are relatively low, so that certain viscous oils may have to be diluted with light solvents, while less viscous oils can be extracted without being previously diluted. On the other hand, oil which may be regarded as being viscous at ordinary temperatures (say, over 80 seconds at 100° F. Saybolt universal) would become easy flowing at the slightly elevated temperatures of extraction with furfural, for example, or some other selective solvent, so that their dilution for the purpose of reducing the viscosity would be unnecessary. The use of auxiliary solvents in these cases would serve only the purpose of improving the extraction efficiency through the effect of such solvents on the distribution of the components being extracted between the extract and raffinate phases, no dilution being necessary. Relatively light aromatic extracts, such as those boiling within gasoline or kerosene ranges, which can be later removed from the products of extraction, may be used with advantage as equivalents of benzol in extracting the oils which are not viscous at the extraction temperature.

We claim as our invention:

1. In an extraction process for refining hydrocarbon oils, the steps of bringing a liquid hydrocarbon oil into contact with a selective solvent for non-paraffinic hydrocarbons, in the presence of an auxiliary solvent selected from the group consisting of: benzol and toluol, under conditions causing the formation of liquid extract and raffinate phases, and separating the said phases.

2. In an extraction process for separating a mineral hydrocarbon oil into two component groups, the steps of contacting a liquid mineral hydrocarbon oil with furfural in the presence of toluol under conditions causing the formation of liquid raffinate and extract phases, and separating said phases.

3. In an extraction process for separating a hydrocarbon oil into portions having different degrees of paraffinicity, the steps of bringing a liquid hydrocarbon oil into contact with furfural in the presence of an auxiliary solvent selected from the group consisting of: benzol and toluol, under conditions causing the formation of liquid raffinate and extract phases, and separating the said phases.

4. In an extraction process for separating a hydrocarbon oil into portions having different degrees of paraffinicity, the steps of bringing a liquid hydrocarbon oil into contact with acetone in the presence of an auxiliary solvent selected from the group consisting of: benzol and toluol, under conditions causing the formation of liquid raffinate and extract phases, and separating the said phases.

5. In an extraction process for separating a hydrocarbon oil into portions having different degrees of paraffinicity, the steps of contacting a stream of liquid hydrocarbon oil countercurrently with a stream of a selective solvent for non-paraffinic hydrocarbons under conditions causing the formation of liquid raffinate and extract phases in the presence of an auxiliary solvent selected from the group consisting of: benzol and toluol, a portion only of said auxiliary solvent being initially introduced into the counterflowing streams with the fresh selective solvent, and another portion being introduced into said streams at a point spaced from the point of introduction of the selective solvent in the direction of the point of introduction of the initial oil, and separating said phases.

JOHANNES ARNOLDUS BUCHEL.
REYERUS NICOLAAS JAN SAAL.